(12) United States Patent
Wang et al.

(10) Patent No.: US 7,804,281 B2
(45) Date of Patent: Sep. 28, 2010

(54) REDUCING COMMON MODE NOISE OF POWER FACTOR CORRECTION CONVERTERS USING GENERAL BALANCE CONCEPT

(75) Inventors: Shuo Wang, Blacksburg, VA (US); Fred Lee, Blacksburg, VA (US); Pengju Kong, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 182 days.

(21) Appl. No.: 11/531,392

(22) Filed: Sep. 13, 2006

(65) Prior Publication Data

US 2008/0061748 A1    Mar. 13, 2008

(51) Int. Cl.
*G05F 1/652* (2006.01)
*H02M 1/12* (2006.01)

(52) U.S. Cl. .......................................... 323/222; 363/39
(58) Field of Classification Search ................. 323/222, 323/282, 283, 284, 288; 363/39
See application file for complete search history.

(56) References Cited

U.S. PATENT DOCUMENTS

| | | | | |
|---|---|---|---|---|
| 5,977,754 | A * | 11/1999 | Cross | 323/222 |
| 6,266,259 | B1 * | 7/2001 | Franck | 363/132 |
| 6,304,065 | B1 * | 10/2001 | Wittenbreder | 323/259 |
| 6,507,176 | B2 * | 1/2003 | Wittenbreder, Jr. | 323/259 |
| 6,897,641 | B1 * | 5/2005 | Herbert | 323/282 |
| 7,545,656 | B2 * | 6/2009 | Lanni | 363/39 |
| 2005/0017699 | A1 * | 1/2005 | Stanley | 323/282 |

OTHER PUBLICATIONS

Wang et al.; "Common Mode Noise Reduction for Boost Converters Using General Balance Technique"; 37th IEEE Power Electronics Specialists Conference, Jun. 18-22, 2006; pp. 3142-3144.

* cited by examiner

*Primary Examiner*—Adolf Berhane
(74) *Attorney, Agent, or Firm*—Whitham, Curtis, Christofferson & Cook, P.C.

(57) ABSTRACT

Common mode (CM) noise is substantially canceled in a switching power supply circuit such as a boost converter by providing a split inductor and analyzing the switching power supply circuit as a bridge circuit formed of the switch, portions of the split inductor and parasitic capacitances of respective portions of the power supply circuit. The bridge can then be balanced by addition of capacitance in parallel with the parasitic capacitance of a respective portion of the power supply circuit or dividing the split inductor such that a ratio of inductances of respective portions of the split inductor approximates a ratio of parasitic capacitances of the respective power supply circuit portions which may be measured or otherwise empirically determined. CM noise reduction of up to 40 db can be achieved without symmetric circuit design, addition of circuit elements or complex filtering having added cost, space requirements and power losses. Further, such a reduction in common mode noise allows simple EMI filtering arrangements to be employed further reducing cost and space requirements for the power supply circuit.

9 Claims, 2 Drawing Sheets

$I_{LISN} = I_{CC1} - I_{CC2}$

US 7,804,281 B2

REDUCING COMMON MODE NOISE OF POWER FACTOR CORRECTION CONVERTERS USING GENERAL BALANCE CONCEPT

STATEMENT OF GOVERNMENT INTEREST

This invention was made in connection with National Science Foundation Contract EEC-9731677. The U. S. Government may have certain rights in this invention.

BACKGROUND OF THE INVENTION

1. Field of the Invention

The present invention generally relates to power supplies and power factor correction power converters and, more particularly to reduction of common mode (CM) noise produced therein.

2. Description of the Prior Art

Most electronic devices currently in use operate on a more or less constant voltage direct current (DC) power rather than alternating current (AC) generally used for power distribution. This voltage is generally produced by a power supply or power converter included in such electronic devices which may include an AC to DC power supply such as a rectifier and filter and a further regulator stage to stabilize the output voltage at a desired value. It is also common, if not required, to provide an arrangement for correction of power factor and electromagnetic interference (EMI) filtering.

To improve efficiency of the voltage regulator generally included in electronic devices, a switching arrangement is often used to control the voltage developed at the output since an ideal switch does not consume power in the on or off state while significant power is dissipated by any regulating element or circuit which functions as a variable impedance in the current path since a voltage drop will always exist across it while significant current levels are provided through it. In some designs, such as alternators or for boosting the output voltage above the voltage supplied by a power source, switching is indispensable.

However, use of a switching arrangement is a source of common mode (CM) noise due to the unavoidable voltage variation dv/dt which results from the power switching function and the unavoidable parasitic capacitance between the power circuit and ground. CM noise is thus very difficult to control particularly due to the parasitic capacitance between respective portions of the power circuit and the case, the circuit board, other circuits and the like, which are subject to unpredictable variation from slight changes in geometry and proximity to various structures. Attempts to reduce CM noise have generally been attempted through strict symmetric design (which is not always compatible with requirements of the powered circuit and often requires additional components which may be unnecessary for any other reason) or through intensive filtering which also compromises efficiency and is often expensive and consumes significant space. Even so, reduction in CM noise has generally been limited to about 20 db which is insufficient to allow simplification or reduction in size and weight of EMI filtering arrangements.

SUMMARY OF THE INVENTION

It is therefore an object of the present invention to provide a technique for substantial cancellation of common mode noise which is simple, inexpensive and of low volume and capable of providing as high as a 40 db reduction of common mode (CM) noise and which is sufficient to allow simplification of EMI filtering and without requiring a performance penalty such as loss of efficiency.

In order to accomplish these and other objects of the invention, a power supply circuit is provided comprising an inductor configured in two portions, a switch controlling conduction through said inductor, circuit portions having respective parasitic capacitances, and means for approximately balancing currents in said two portions of said inductor.

In accordance with another aspect of the invention, a method of cancelling common mode noise in a power supply circuit including a switch is provided including steps of determining parasitic capacitances of circuit portions forming respective portions of a bridge network in combination with the switch and respective portions of an inductor, and approximately balancing the bridge network.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
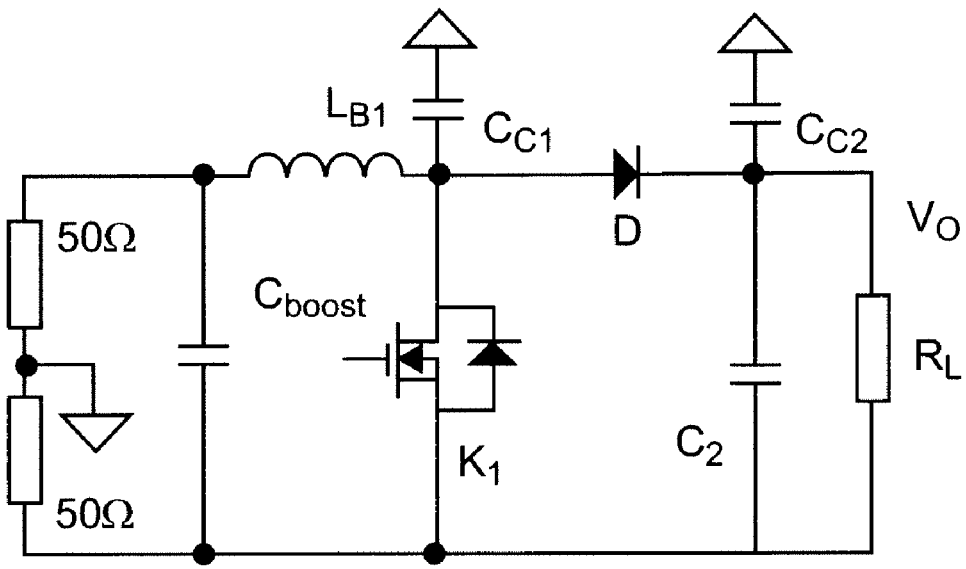
FIG. 1 is a schematic circuit diagram of a boost power factor correction (PFC) converter which is representative of circuits to which the invention may be applied and useful for conveying an understanding of common mode noise generation.

Referring now to the drawings, and more particularly to FIG. 1, there is shown a schematic circuit diagram of a boost power factor correction converter (but without an input rectifier, bridge or other power input arrangement being illustrated since the nature of the power input is irrelevant to an understanding of the invention and principles thereof sufficient to its practice) of a general type to which the invention is particularly applicable. The voltage boost circuit of FIG. 1 will also enable the application of the principles of the invention to other types of power supplies and converters such as DC to DC converters, dual boost PFC converters and inverters, forward converters, flyback converters or any other power circuit topologies. Further, it should be understood that since FIG. 1 and the equivalent circuit model of FIG. 2 are arranged to facilitate an understanding of the basic principles of common mode (CM) noise and its causes, no portion of either Figure is admitted to be prior art in regard to the present invention even though the invention is not specifically depicted therein but could be considered as being illustrated therein as will be evident from the discussion of FIGS. 3 and 4 below.

The circuit of FIG. 1 includes a switch K, comprising a field effect transistor (e.g. a MOSFET) and diode (an internal diode of the transistor), a boost capacitor $C_{boost}$, boost inductor $L_{B1}$, diode D output capacitor $C_2$ and a load $R_L$. As is known, when switch $K_1$ is turned on, the input voltage is added to the inductor $L_B$, and the current is built up. When switch $K_1$ is turned off, the current in inductor $L_B$ turns on diode D and then charges the output capacitor $C_2$ and thus provides current to load $R_L$. The desired output voltage Vo can therefore be built up by current in $L_B$. The 50 Ohm resistors illustrated correspond to the impedance of line impedance stabilization networks (LISNS) which are used to measure the noise.

The major parasitic parameters affecting common mode noise are $C_{C1}$, the parasitic capacitance between the drain of switch $K_1$ and ground, and $C_{C2}$, the total parasitic capacitance from the load side including the parasitic capacitance of any printed circuit board (which is usually employed) or other circuit structure and ground, between the load and ground and between the cathode/output of diode D and ground.

Figure 2:
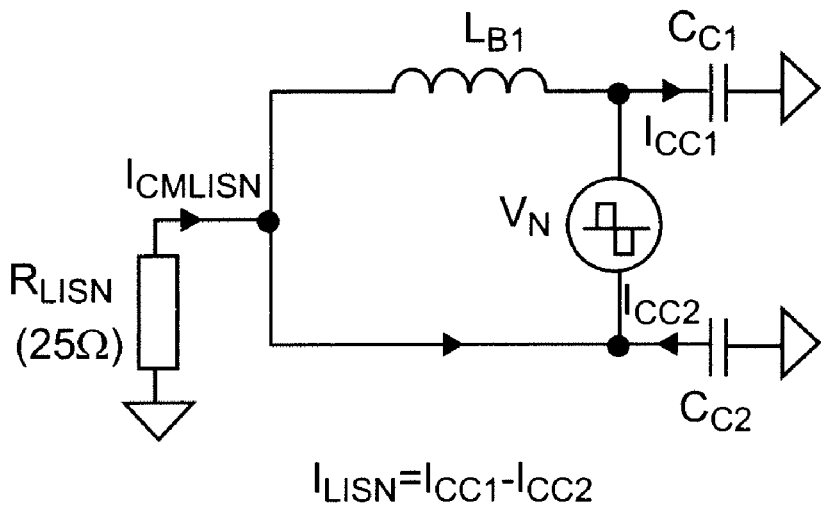
FIG. 2 is a noise model simplification of the circuit of FIG. 1.

In the circuit of FIG. 1, the switch $K_1$ can be considered as the noise source $V_N$ as depicted in FIG. 2. Similarly, the parallel 50 Ohm resistors corresponding to the LISNs may be represented by a 25 Ohm resistor $R_{LISN}$ as illustrated in FIG. 2. Omitting the rectifier, filter and load circuit as being largely irrelevant to the CM noise generation other than by reason of the parasitic capacitances they impose, represented by $C_{C1}$ and $C_{C2}$, the circuit of FIG. 1 can be simplified and modeled as the equivalent circuit illustrated in FIG. 2.

It is evident and should be noted from FIG. 2 that CM noise currents $I_{CC1}$ and $I_{CC2}$ flow to ground with opposite directions through the parasitic capacitors $C_{C1}$ and $C_{C2}$ because of the different potentials on opposite sides of noise source $V_N$. Thus the CM noise current $I_{CMLISN}$ flowing through the LISNs (and evaluated as the voltage drop across the parallel 50 Ohm impedances) is the difference of $I_{CC1}$ and $I_{CC2}$ and thus to reduce CM noise, $I_{CMLISN}$ should be as small as possible. The basic principle of the invention is thus to reduce $I_{CMLISN}$ by balancing $I_{CC1}$ and $I_{CC2}$ to cause $I_{CMLISN}$ approach zero or, under ideal conditions, equal to zero as will now be discussed in connection with FIGS. 3 and 4.

Figure 3:
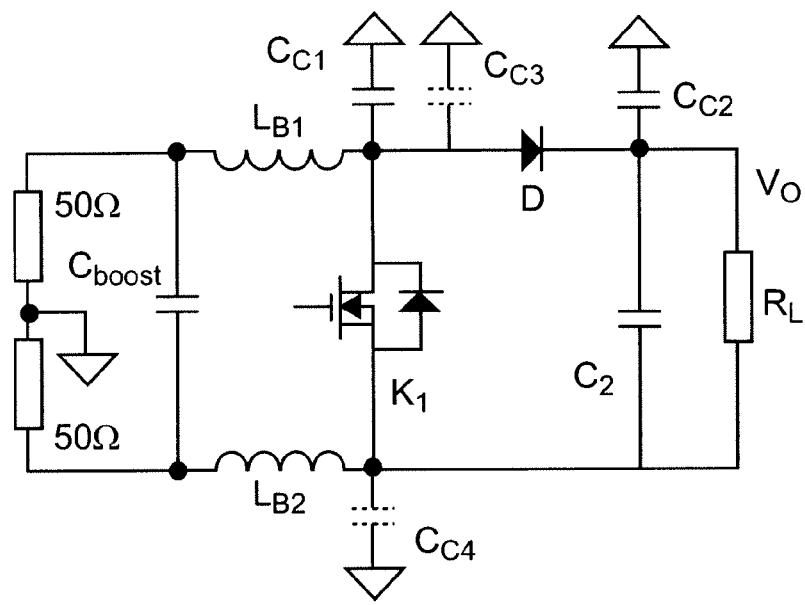
FIG. 3 is a schematic circuit diagram similar to that of FIG. 1 useful for conveying an understanding of the invention.
Figure 4:
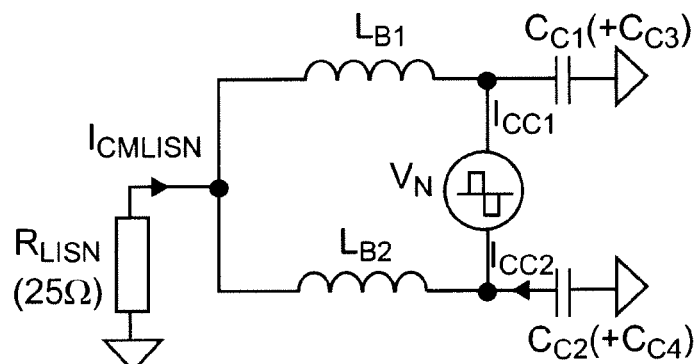
FIG. 4 is a noise model simplification of the circuit of FIG. 3.

It will be recognized that FIG. 3 is identical to FIG. 1 but for the addition of capacitors $C_{C3}$ and $C_{C4}$ illustrated with dashed lines and the splitting of boost inductor into two coupled portions $L_{B1}$ and $L_{B2}$. Thus, applying the circuit simplifications discussed above, the simplified equivalent circuit of FIG. 3 is shown in FIG. 4 which can be considered as a Wheatstone bridge. Thus, if the bridge is balanced $I_{CMLISN}$ is zero. A balanced condition will be achieved when the equation $$L_{B1}(C_{C1}(+C_{C3})) = L_{B2}(C_{C2}(+C_{C4})) \quad (1)$$

is satisfied; which can be achieved in several ways.

For example, one method of satisfying Equation 1 is to make $L_{B1}=L_{B2}$ and $(C_{C1}(+C_{C3}))=(C_{C2}(+C_{C4}))$ which can be realized in practice by accurate splitting of the inductor and adding a balancing capacitor for either $C_{C3}$ or $C_{C4}$ (or both). Another method would be to omit $C_{C3}$ and $C_{C4}$ but to make $L_{B1}/L_{B2}=C_{C2}/C_{C1}$ which can be realized in practice by appropriate proportional splitting of the inductor in accordance with a measured or otherwise empirically determined ratio of parasitic capacitances. It should be noted that, in either case, coupling of the split portions of the inductor increases the balance of parasitics at high frequencies.

Figure 5:
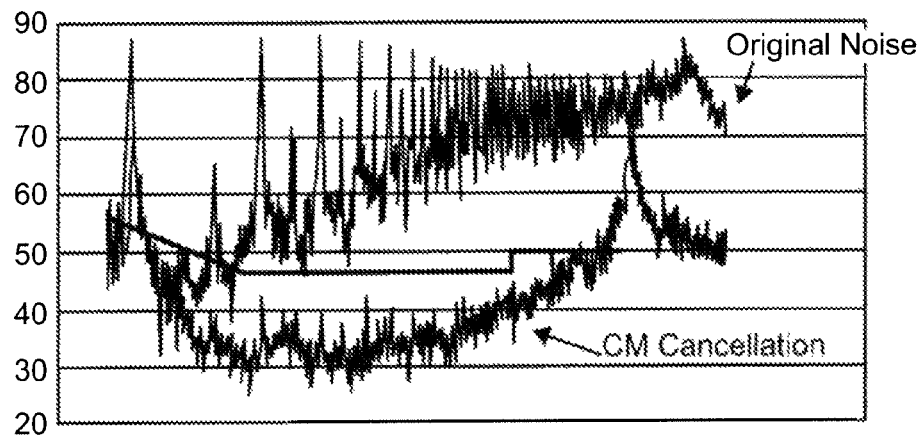
FIG. 5 is a graphical illustration of the improvement in reduction of common mode noise achieved in accordance with the invention.

The efficacy of the invention to achieve substantial cancellation of CM noise is illustrated in FIG. 5. While it is difficult in practice to precisely satisfy Equation 1, above, achieving a sufficient balance to provide much greater CM noise reduction than has heretofore been achieved with filters or symmetrical circuit designs is not particularly critical or difficult to achieve, particularly when high coupling coefficient is exhibited between the inductor portions (e.g. split windings) which enhances balancing of inductor parasitics such as winding capacitance and loss as noted above.

The experimental data illustrated in FIG. 5 was obtained using a boost converter with a switching frequency of 200 KHZ with a turns ratio of the split inductors of 2:1, $C_{C1}$ of 16 pf, $C_{C2}$ of 46 pf and a 7 pf capacitor in parallel with $C_{C1}$ to meet the balance conditions so that the ratio of $C_{C2}:C_{C2}$+the parallel capacitor is 46:23 or 2:1. In FIG. 5, the upper trace is the measured CM noise of the original converter without any noise cancellation measures in accordance with the invention being taken. The lower trace in FIG. 5 represents the measured CM noise using the second method of satisfying equation 1 discussed above where the inductance is divided to approximately match the proportionality of the parasitic capacitances and without adding additional balancing capacitance.

It can be observed from FIG. 5 that the balancing of noise currents in accordance with the invention as described above produces a substantial reduction of CM noise 10 db to 45 db below the original noise. Moreover, it can be clearly observed from FIG. 5 that the noise reduction tends to exhibit greater improvement at higher frequencies due to the improved balancing of parasitics at higher frequencies noted above. Thus, the current trend toward increased switching frequency for reasons unrelated to the present invention can be exploited in accordance with the invention to provide substantial cancellation of common mode noise.

In view of the foregoing, it is clearly seen that the invention provides for substantial cancellation of common mode noise without significant criticality or requirement for precision components. More importantly, exploitation of balancing of impedance ratios in accordance with Wheatstone bridge theory avoids the much more critical and burdensome constraint of symmetrical circuit design and allows omission of components such as a diode which would be necessary to achieve symmetric circuit design while achieving improved noise cancellation performance while reducing cost, size and power loss.

It should also be appreciated, especially since a 40 db reduction in noise corresponds to a factor of 100, that a very low CM noise level can be achieved at low cost and possibly no additional circuit elements and without any size penalty as is presented by approaches which involve filtering or strict symmetry of physical design and moreover, the increased reduction in CM noise allows smaller and more simple EMI filtering to be employed; actually reducing cost and size of converters and inverters to which the invention may be applied.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A power supply circuit comprising
    an inductor configured in two portions, said two portions of said inductor being connected in series,
    a switch controlling conduction through said two portions of said inductor,
    circuit portions having respective parasitic capacitances, said parasitic capacitances being independent of parasitic capacitances of said two portions of said inductor,
    said parasitic capacitances and said two portions of said inductor forming a bridge circuit and said switch being a source of noise voltage, and
    means for approximately balancing currents due to said switch and the equivalent impedance ratio of said parasitic capacitances of said circuit portions to a ratio of inductances of said two portions of said inductor.

2. A power supply circuit as recited in claim 1 wherein the inductances of said two portions of said inductor are equal and wherein said power supply circuit includes a capacitance in parallel with said parasitic capacitance of one of said circuit portions.

3. A power supply circuit as recited in claim 2, wherein said portions of said inductor are inductively coupled.

4. A power supply circuit as recited in claim 1, wherein said inductor is divided into portions such that a ratio of the inductances of said two portions approximates a ratio of said respective parasitic capacitances.

5. A power supply circuit as-recited in claim 4, wherein said portions of said inductor are inductively coupled.

6. A method of substantially cancelling common mode noise in a power supply circuit including a switch, said method including steps of determining parasitic capacitances of circuit portions forming respective portions of a bridge network in combination with said switch and respective portions of an inductor, and approximately balancing said bridge network wherein said step of approximately balancing said bridge network includes a step of adding capacitance in parallel with a said parasitic capacitance.

7. A method as recited in claim 6 wherein said step of adding capacitance is performed by connecting a capacitor in parallel with said parasitic capacitance.

8. A method of substantially cancelling common mode noise in a power supply circuit including a switch, said method including steps of determining parasitic capacitances of circuit portions forming respective portions of a bridge network in combination with said switch and respective portions of an inductor, and approximately balancing said bridge network wherein said step of approximately balancing said bridge network includes a step of dividing said inductor into portions such that a ratio of said inductances of respective portion of said inductor approximates a ratio of said parasitic capacitances.

9. A method as recited in claim 8, wherein said portions of said inductor are inductively coupled.

\* \* \* \* \*